(No Model.) 2 Sheets—Sheet 1.
N. W. & A. H. HUSSEY.
COW MILKER.
No. 514,551. Patented Feb. 13, 1894.
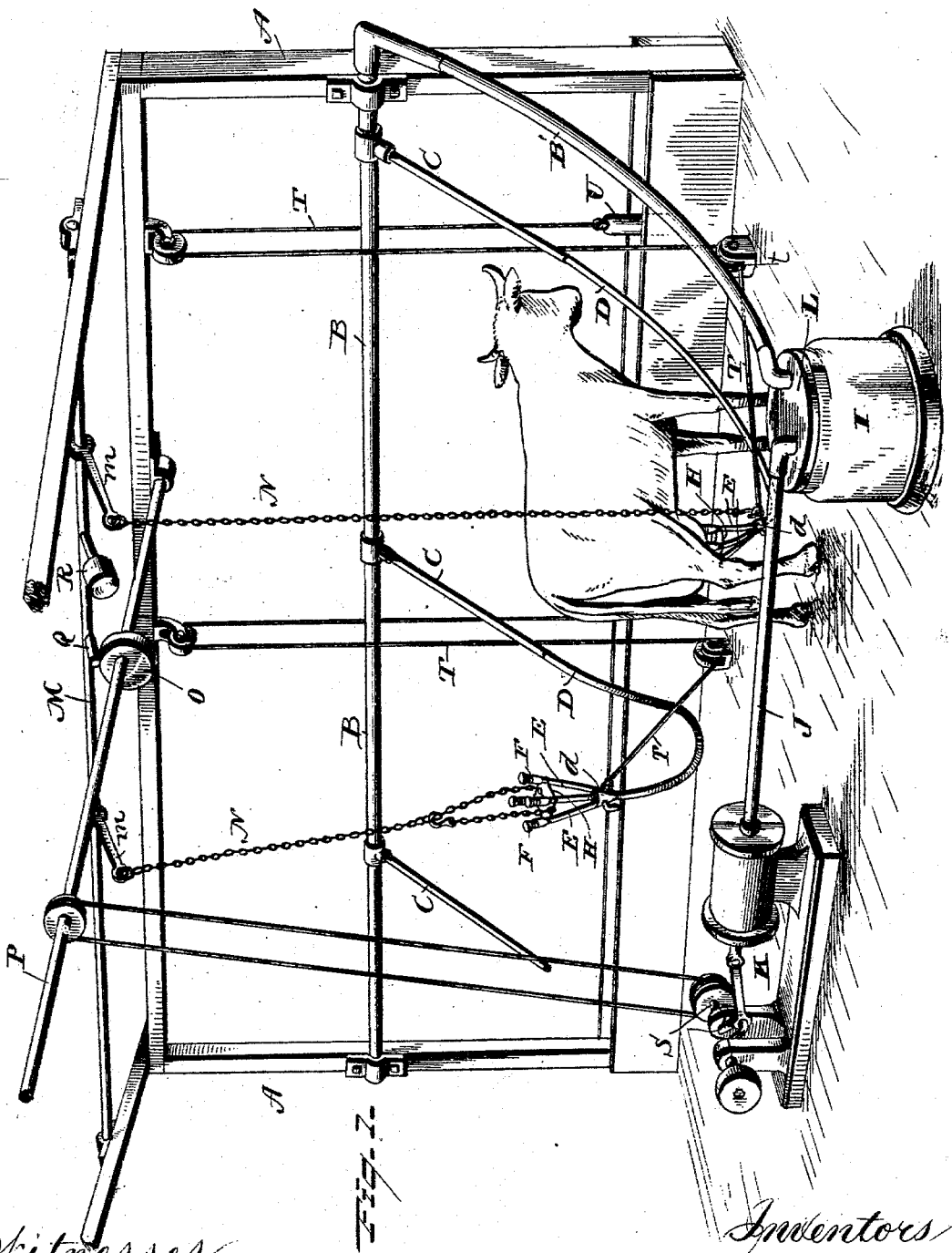

(No Model.)  N. W. & A. H. HUSSEY.  2 Sheets—Sheet 2.
COW MILKER.
No. 514,551.  Patented Feb. 13, 1894.
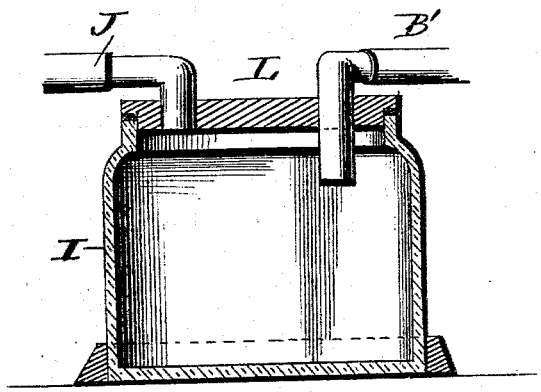
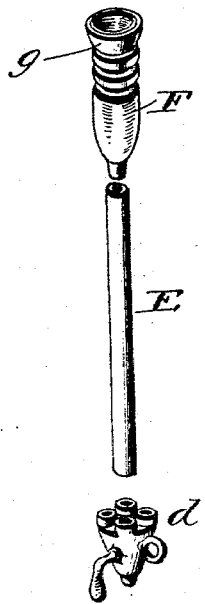
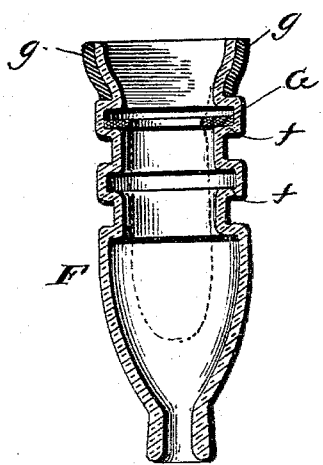
Witnesses
C. J. Williamson.
Wm. G. Goodwin.
Inventors
Nathan W. Hussey.
Asahel H. Hussey.
per Chas. H. Fowler
Attorney.

UNITED STATES PATENT OFFICE.

NATHAN W. HUSSEY AND ASAHEL H. HUSSEY, OF MOUNT PLEASANT, OHIO.

COW-MILKER.

SPECIFICATION forming part of Letters Patent No. 514,551, dated February 13, 1894.

Application filed October 31, 1893. Serial No. 489,643. (No model.)

*To all whom it may concern:*

Be it known that we, NATHAN W. HUSSEY and ASAHEL H. HUSSEY, citizens of the United States, residing at Mount Pleasant, in the county of Jefferson and State of Ohio, have invented certain new and useful Improvements in Cow-Milkers; and we do hereby declare that the following is a full, clear, and exact description of the same, reference being had to the annexed drawings, making a part of this specification, and to the letters of reference marked thereon.

The present invention relates to machines for milking cows, and has for its object the provision of a simple, cheap and easily operated apparatus that will enable a number of cows to be milked simultaneously, and both thoroughly and rapidly, and without annoyance or injury to the cows; and to this end said invention consists in the apparatus having the construction and combination of parts hereinafter specified and claimed.

In the drawings:—Figure 1 is a perspective view of the apparatus; Fig. 2 a vertical section of the milk receptacle; Fig. 3 a detail perspective of the nipple-carrying tubes and their coupling. Fig. 4 is a detail vertical section through one of the nipples or teat cups.

Referring to the drawings by letter, A, A, designate two posts or uprights either erected especially for the purpose or forming part of the structure of the cow stable, to which is attached a horizontal pipe B of such length as to extend over a space occupied by a number of cows standing side by side a suitable distance apart. Preferably this space will be divided by partitions into stalls, but such partitions are not shown in the drawings, their omission being in the interest of clear illustration. Tapped into said pipe is a branch pipe or tube C for each cow to be milked that is preferably of metal, and coupled to which is a length of hose or flexible tubing D that in turn is coupled by a coupling $d$ to four flexible tubes E adapted to be attached to the teats of the cow. At one end the coupling $d$ has a single spud for the hose D while at its other end it has four spuds, one for each tube E. The nipple or teat-cup F of each tube E is preferably made of glass and its upper end is flared outwardly to permit of its being readily passed over the cow teat, while its lower portion tapers in correspondence to the shape of the latter. Near its upper end the nipple has two annular enlargements $f, f$ which form seats to receive and hold a rubber washer G that by its pressure upon the cow teat serves to hold the nipple thereon as well as to form an air tight connection therewith. A number of washers will be provided with each nipple having openings of different diameter so as to adapt the nipple for use with different sizes of teats. These washers are made of soft rubber and are not at all uncomfortable to the animal. By the employment of the annular enlargements as seats for the washers, the latter do not have to be cemented or otherwise fastened, but are simply placed loosely in said seats, thus enabling their attachment to and removal from the nipple most easy. The internal diameter of the nipple is greater than the thickness of the cow teat so that on the exhaustion of the air from the nipple, in the manner to be described, the teat can freely expand and thus open the milk passages and cause a free and rapid discharge of milk. Around the upper, flaring end of the nipple is placed a rubber ring $g$ to save the nipple from being broken should it strike or be struck by hard objects. For conveniently holding the nipples in about their proper relative positions for application to the cow teats, they are connected together by a cord H. This is desirable as by reason of the flexibility of the tubes E they would fall away from each other and make their handling somewhat inconvenient. One end of the main pipe is closed and the other is connected by a pipe B' with a vessel or receptacle I. The latter is air-tight and is connected by a pipe J with a suitable air pump K for exhausting the air from it and its pipe connections with the cows and thus draw the milk from the latter and discharge it into said receptacle. The pipes B' and J pass through the removable top L of the vessel the former being extended about two inches from the top while the latter is carried just through said top. The object of this arrangement is to prevent all possibility of any milk being drawn into the pipe J by the pump.

It has been found that the impartation of an up and down motion to the nipples so as to produce such an action upon the teats similar to that given by the hand of a person or the pushing of the calf in nursing, is of material assistance and results in a fuller and freer flow of milk than would otherwise be obtained. To produce this motion a rock shaft M is journaled overhead that is provided with a number of radial arms m equal to the number of cows from each of which depends a chain N whose lower end is connected with the nipple carrying tubes as shown. A cam O on a shaft P journaled at right angles to the shaft M engages the under side of a radial arm Q on the shaft M and operates to rock the latter to lift the chains N while a weight R supplements the weight of the chains to cause them to lower. The shaft P may be revolved by any suitable means, but it can be conveniently driven from the pump shaft S by a belt running from a pulley on the latter to a pulley on said shaft P. The chains are also useful as preventing the nipples from reaching the floor should they fall and thus avoid the possibility of dirt being sucked in. They can also be conveniently employed as shown in Fig. 1 for suspending a set of nipples when they are not in use.

To prevent the branch pipe from becoming entangled in the legs of the cow or being trodden upon as she may move about, a rope or chain T is attached to or near to the nipple carrying tubes and after being carried horizontally to a pulley t is carried up to and over a second pulley and has on its other end a weight U of sufficient gravity to draw upon the branch tube and keep it from being tangled and yet not interfere with free motions of the cow in short limits. Preferably as a further precaution to prevent dirt being drawn in to the tubes, a stop cock is provided in the coupling d, which is kept closed until the nipples are to be attached to the teats.

The object in having two washer seats in the nipples is to adapt the nipples for use with long or short teats, it having been found desirable in practice to get the washers comparatively near the teat end as insuring a better flow of the milk.

In practical use our apparatus has been found very efficient and by it a number of cows can be milked as quickly and as easily as one, and of course, a great deal more rapidly than one can be by hand. The nipples neither injure nor annoy the cows and operate most perfectly.

When it is desired to wash or clean the pipes, it can be readily and quickly done by simply pumping water through them.

What we claim is—

1. In combination, the main pipe, the branch pipe to which nipple carrying tubes are connected, the rock shaft, connections between it and said tubes, means for actuating said shaft, a milk receptacle to which said main pipe is connected and an air pump connected to said receptacle, substantially as specified.

2. In combination, the main pipe, the branch pipe to which nipple carrying tubes are connected, the rock shaft having a radial arm, the chain between said arm and the tubes, the eccentric for actuating said shaft, a milk receptacle to which said main pipe is connected, and an air pump connected to said receptacle, substantially as specified.

3. In combination, the nipples having each a washer seated in an annular enlargement, the main pipe, the branch pipe having tubes to which the nipples are connected, the rock shaft, connections between it and said tubes, means for actuating said shaft, a milk receptacle to which the main pipe is connected, and an air pump connected to said receptacle, substantially as specified.

In testimony that we claim the above we have hereunto subscribed our names in the presence of two witnesses.

NATHAN W. HUSSEY.
ASAHEL H. HUSSEY.

Witnesses:
R. W. CHAMBERS,
GEO. H. CHAMBERS.